United States Patent [19]

Griffith

[11] Patent Number: 4,599,668
[45] Date of Patent: Jul. 8, 1986

[54] INDUCTIVELY-COUPLED, THIN-FILM M-R HEAD

[75] Inventor: Neil J. Griffith, San Diego, Calif.

[73] Assignee: Eastman Kodak Company, Rochester, N.Y.

[21] Appl. No.: 504,757

[22] Filed: Jun. 15, 1983

[51] Int. Cl.⁴ .......................... G11B 5/12; G11B 5/30
[52] U.S. Cl. .................................... 360/113; 360/126
[58] Field of Search ............... 360/113, 126; 324/252; 338/32 R; 365/157, 158

[56] References Cited

U.S. PATENT DOCUMENTS

| | | | |
|---|---|---|---|
| 3,860,965 | 1/1975 | Voegeli | 360/113 |
| 3,864,751 | 2/1975 | Beaulieu et al. | 360/113 |
| 3,987,485 | 10/1976 | Sugaya et al. | 360/63 |
| 4,012,781 | 3/1977 | Chia-Hsiung Lin | 360/113 |
| 4,051,542 | 9/1977 | Kanai | 360/113 |
| 4,255,772 | 3/1981 | Perez et al. | 360/113 |
| 4,300,177 | 11/1981 | Koel et al. | 360/113 |
| 4,315,291 | 2/1982 | Lazzari | 360/113 |
| 4,375,657 | 3/1983 | Brock et al. | 360/125 |

Primary Examiner—John H. Wolff
Assistant Examiner—David J. Severin
Attorney, Agent, or Firm—Robert F. Cody

[57] ABSTRACT

The invention teaches that if a "shorted" electrically conductive turn—deposited on a magnetic substrate—is employed to sense recorded signal flux, then the underlying substrate will efficiently support flux induced about the shorted turn . . . and such induced flux will correspond proportionately to the recorded signal flux. In accordance with the invention, an MR element is so situated that it senses induced flux about the shorted turn at a location thereof that is remote from the medium whose signal flux is to be reproduced.

11 Claims, 5 Drawing Figures

INDUCTIVELY-COUPLED, THIN-FILM M-R HEAD

BACKGROUND OF THE INVENTION

1. Field of the Invention

This invention relates in general to magnetic heads and, in particular, to an improved form of magnetoresistive (MR) head.

2. Description Relative to the Prior Art

For a variety of reasons, there is—in the magnetic recording arts—a trend toward the use of multitrack magnetic heads having a large number of gapped transducer cores per widthwise inch of such heads. Typically, core-to-core spacing may be on the order of 6 mils. In order to build a head with a large number of cores per widthwise inch thereof, photolithographically shaped thin films are often employed for individual core structures. Whereas a record head may be effective while employing a minimal number of coil turns per core leg, a reproduce head on the other hand will often require a relatively large number of turns—typically 200—per core leg. Reason: while large currents can be applied to a record head with few turns to effect signal recording, a large number of coil turns coupled to a reproduce head is necessary to develop a signal from the relatively weak flux associated with recorded signals. Coil structures, like core structures, are formed of deposited thin films.

Given the tight spacing between adjacent cores of a high density multitrack head, an impasse occurs as more and more coil turns are crammed into coupled cooperation with the core legs. Imagine, for example, the task of depositing a 200-turn thin film coil within a 6 mil spacing. To address this problem, those in the art have drifted toward the use of coil-less MR elements to sense recorded signal flux. As is known, an MR element varies its electrical resistance in response to applied magnetic flux; and so, when a sense current is applied to an MR element, such current will vary in proportion to—and as the analog of—the recorded signal flux.

To maximize the response of a thin film head core having an MR flux sensing element, it is usually desirable to situate the MR element as close to the medium-contacting surface of the core as is possible, whereby the full impact of recorded signal flux will be felt directly by the MR element. So locating an MR element, however, is not without difficulty: the closer the MR element is to a recording medium with which it cooperates, the more the MR element will be subject to noise associated with thermomechanical interaction between the core and medium . . . which interaction magnetostrictively affects the MR element. While it is, of course, possible to configure core parts so as to position an MR element far from the medium-contacting surface of the core to obviate the noise problem, such a tack is self-defeating in that it inherently builds inefficiency into the head as the flux leakage path is increased.

Representative prior art patents depicting MR heads of the type that directly responds to recorded signal flux are: U.S. Pat. Nos. 3,860,965, 3,864,751, 3,987,485, 4,012,781, 4,255,772, and 4,375,657.

SUMMARY OF THE INVENTION

Rather than employ an MR element so that it directly responds to recorded signal flux, the invention teaches that if a "shorted" electrically conductive turn—deposited on a magnetic substrate—is employed to sense such recorded signal flux, then the underlying substrate will efficiently support flux induced about the shorted turn . . . and such induced flux will correspond proportionately to the recorded signal flux. Thus, in accordance with the invention, an MR element is so situated that it senses induced flux about a shorted turn at a location thereof that is remote from the medium whose signal flux is to be reproduced. This means, therefore, that the MR element produces signals corresponding to the recorded signal flux without being subject to thermo-mechanical interaction between the medium and MR element. Admittedly, the inventive technique sacrifices the well known DC response of a magnetic head employing an MR element . . . but there is a wide class of reproduce heads, viz. those designed for higher frequencies at high track densities, for which the invention is not only practical, but ideally suited.

BRIEF DESCRIPTION OF THE DRAWINGS

The invention will now be described with reference to the Figures of which

DESCRIPTION OF THE PREFERRED EMBODIMENTS

Figure 1:
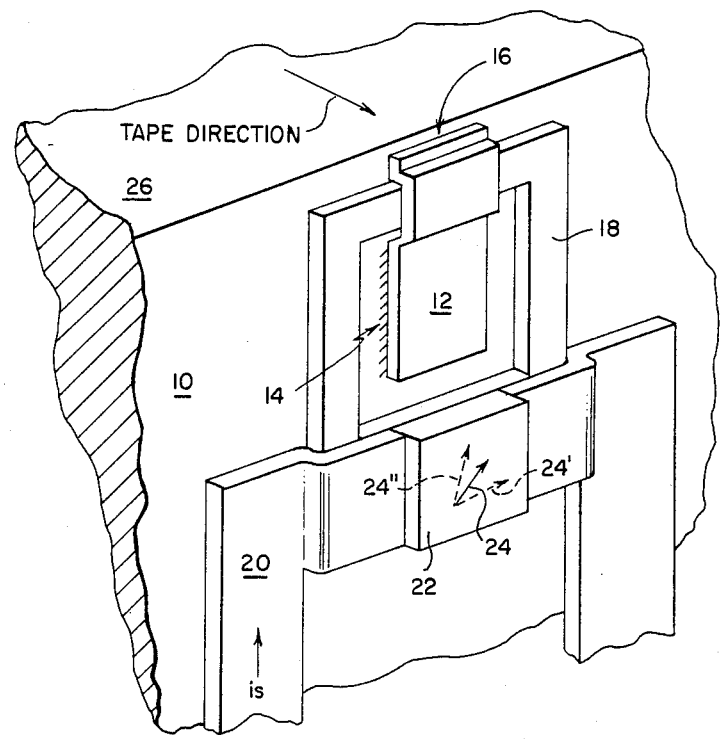
FIG. 1 is a perspective view of a structure embodying the invention.
Figure 2:
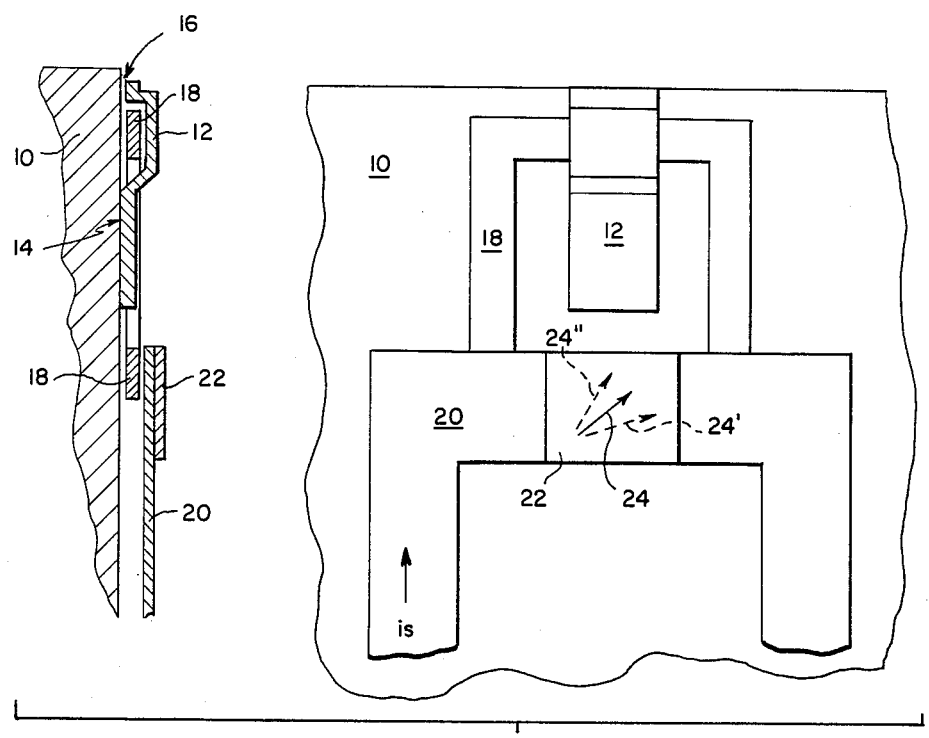
FIG. 2 is a somewhat schematic depiction of front and side elevational aspects of the structure of FIG. 1, FIGS. 3 and 4 are plan views.

Referring to FIGS. 1 and 2, a substrate 10, preferably of ferrite, has a thin film core structure 12 magnetically short-circuited to it at 14. A non-magnetic transducer gap 16 is disposed between the core structure 12 and the substrate 10. For ease of understanding the structure/concept of the invention, the drawings of FIGS. 1 and 2 have been deliberately kept quite simple: there is no showing of magnetically (and electrically) non-conductive spacing material, it being well known to those in the art, for example, that a magnetically non-conductive spacer would usually reside in the gap 16. A single electrically conductive—but shorted—turn 18 is formed on, but is electrically insulated from (FIG. 2), the substrate 10. A sense conductor 20, electrically connected in series with an MR element 22, is disposed in proximity to (but is electrically insulated from) the shorted single turn 18 so that any field developed about the single turn will be felt by the MR element 22. In this embodiment of the invention, the MR element has a canted easy axis (magnetization vector 24) corresponding to a certain quiescent electrical resistance for the element . . . a sense current $i_s$ being adapted to pass through the MR element 22 to detect any magnetic field applied to the MR element.

As a magnetic recording medium rides over the surface 26 of the structure of FIGS. 1 and 2, alternating flux patterns recorded in the medium induce a proportionate alternating current in the shorted turn 18. Current in the shorted turn 18 develops a field thereabout and, in view of the proximity and permeability of the underlying (ferrite) substrate, that field is efficiently transferred to the MR element 22. Attendantly, depending on the direction of the instantaneous current in the shorted turn 18, the magnetization vector 24 will angle (dashed vectors 24', 24'' on the MR element 22) accordingly. Angling as per vector 24' means a detectable change in the sense current in one direction; angling as per the vector 24" means a detectable change in the sense current in the other direction. Because the shorted turn 18 has virtually no magnetostrictive properties, thermomechanical interaction between the magnetic medium and the structure of FIGS. 1 and 2 at the gap 16 thereof is non-existent . . . and, because the MR element 22 is situated remote from the gap 16, the underlying substrate 26—which favorably acts to transfer induced flux in an efficient way—now acts to absorb undesired mechanical energy, and thereby prevent the MR element 22 from being exposed to mechanical noise.

Figure 5:
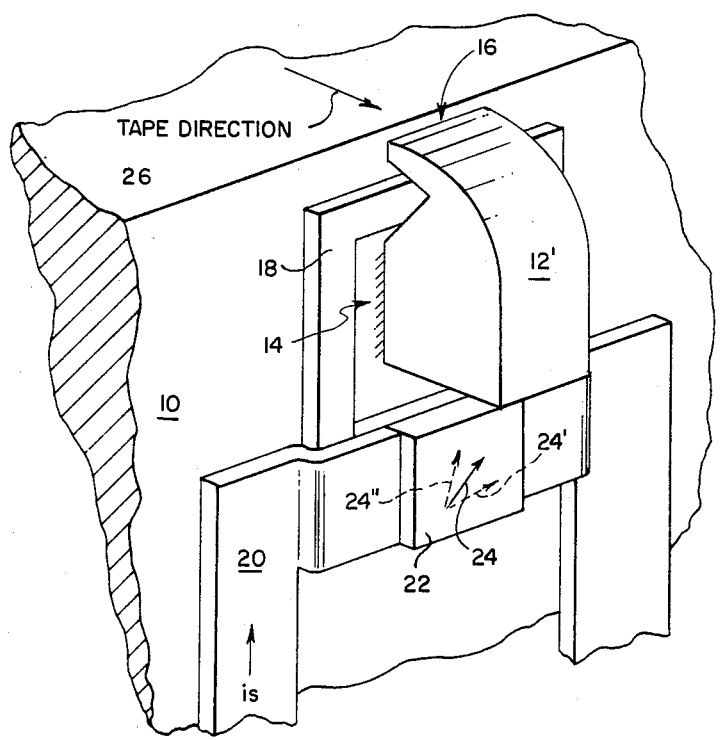
FIG. 5 is a perspective view, of alternative embodiments of the invention.
Figure 3:
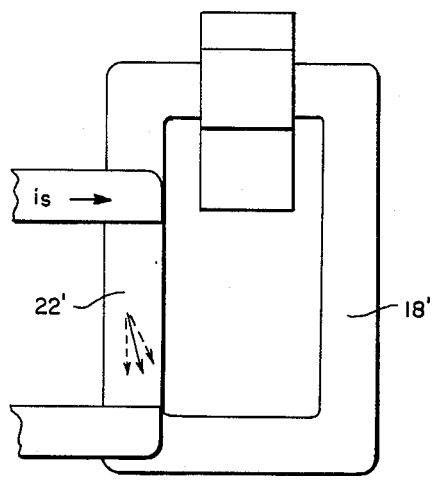
Figure 4:
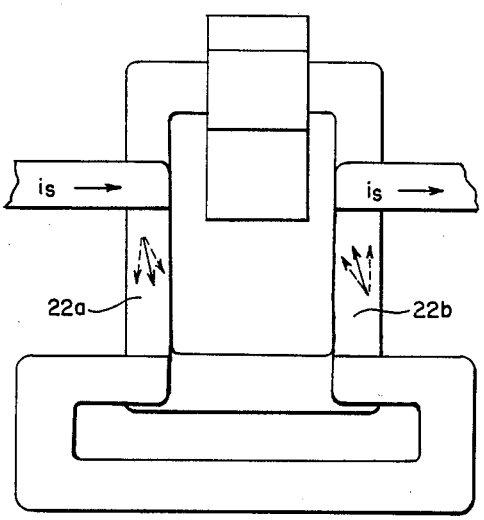

It will be appreciated that, in the embodiment of FIGS. 1 and 2, there is a limit to the length (and therefore "sensitivity") of the MR element which may be employed: i.e. by locating the MR element so that its senses induced flux resulting from current flowing in a widthwise part of the shorted turn, the length of the MR element is limited by the widthwise room available for the core in question. Pursuant to the invention, however, the MR element 22' (FIG. 3) may be made more elongated (greater sensitivity) and disposed to cooperate with a non-widthwise part, i.e. a vertically oriented leg, of a shorted turn 18'. Again, this is made possible by the efficient action of the underlying substrate in transferring induced flux to the MR element 22'. Similarly, paired MR elements 22a, 22b (FIG. 4) may be employed for still greater sensitivity . . . or, if short wavelength response is desired, a half-core structure 12' (FIG. 5) may be employed . . . the commonality among all of the embodiments of FIGS. 1-5 being the use of an underlying magnetic substrate to effect efficient transfer of induced signal flux to a remotely situated MR element.

The invention has been described in detail with particular reference to preferred embodiments thereof, but it will be understood that variations and modifications can be effected within the spirit and scope of the invention. For example, although a shorted "single" turn has been depicted in all of the embodiments of FIGS. 1-5, clearly shorted "multiturn" structures may be employed as well. Also, while an MR element with a canted easy axis is depicted in the figures, clearly various other techniques for biasing a magnetization vector to a quiescent reference orientation may be employed as well.

What is claimed is:

1. A magnetic head for reproducing signals recorded in a track on a magnetic recording medium, said head comprising
   (a) a magnetic substrate,
   (b) a core structure magnetically short circuited to said magnetic substrate at a first point thereof, and physically separated from said substrate at a second point thereof, thereby to form a transducer gap for said head at said second point,
   (c) an electrically shorted turn of electrically conductive material partially disposed between said core structure and said magnetic substrate, said turn being supported by said head and so arranged with respect to said core structure and said substrate that changing magnetic flux which traverses said core structure and said substrate induces current in said electrically shorted turn, and
   (d) magnetoresistive means disposed remoted from said transducer gap but in such proximity to said shorted turn that flux induced about said shorted turn couples with said magnetoresistive means, thereby to produce a detectable change in the magnetization of said magnetoresistive means that is substantially immune to thermomechanically caused noise occurring in proximity to said transducer gap.

2. The magnetic head of claim 1 wherein said electrically shorted turn of electrically conductive material is comprised of a thin film of electrically conductive material deposited on said substrate.

3. The magnetic head of claim 1 wherein said substrate is comprised of ferrite material.

4. The magnetic head of claim 3 wherein said electrically shorted turn of electrically conductive material is comprised of a thin film of electrically conductive material deposited on said substrate.

5. The magnetic head of claim 4 wherein said magnetoresistive means is disposed to carry current in the general direction of the widthwise dimension of said track.

6. The magnetic head of claim 4 wherein said magnetoresistive means is disposed to carry current in a direction that is generally perpendicular to the plane of said magnetic recording medium.

7. A magnetoresistive reproduce head for reproducing signals recorded in a track of a magnetic recording medium, said head comprising
   (a) first and second magnetic means disposed to form a transducer gap,
   (b) a shorted electrical turn so disposed with respect to said first and second magnetic means that changing flux in said means induces electrical current in said turn, and
   (c) magnetoresistive means disposed remote from said transducer gap but in such proximity to said shorted electrical turn that flux induced about said turn in response to current flow therein links said magnetoresistive means to affect the electrical resistance thereof.

8. The reproduce head of claim 7 wherein
   (a) said first magnetic means is a magnetic substrate,
   (b) said second magnetic means is a magnetic thin film formed on said substrate, and
   (c) said shorted electrical turn is a thin film of electrically conductive material that is also deposited on said substrate, whereby said substrate, by virtue of its proximity to the shorted electrical turn formed thereon, provides efficient transfer of flux from about said turn to said magnetoresistive means.

9. The reproduce head of claim 8 wherein said magnetic substrate is comprised of ferrite material.

10. The reproduce head of claim 9 including means for conveying electrical current to and from said magnetoresistive means, said magnetoresistive means being so disposed with respect to said shorted electrical turn that, in operation, said magnetoresistive means carries current in a direction that is generally parallel to the crosswise dimension of said track.

11. The reproduce head of claim 9 including means for conveying electrical current to and from said magnetoresistive means, said magnetoresistive means being so disposed with respect to said shorted electrical turn that, in operation, said magnetoresistive means conveys current in a direction that is generally perpendicular to the plane of said magnetic recording medium.

* * * * *